Figure 1:
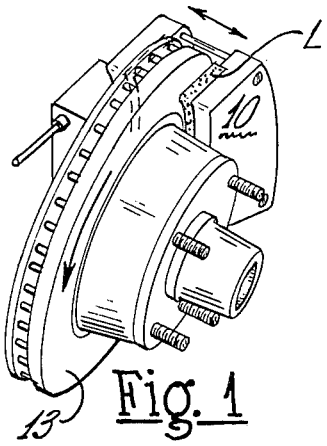
Figure 2:
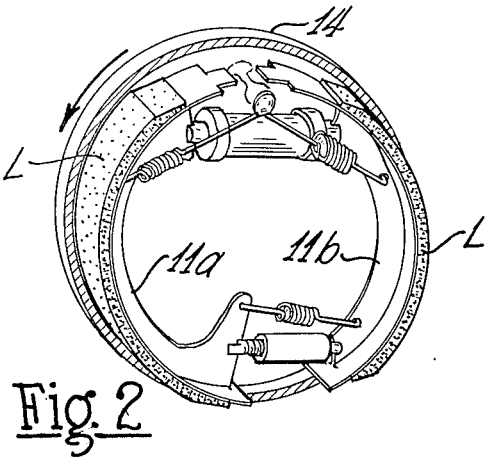
Figure 3:
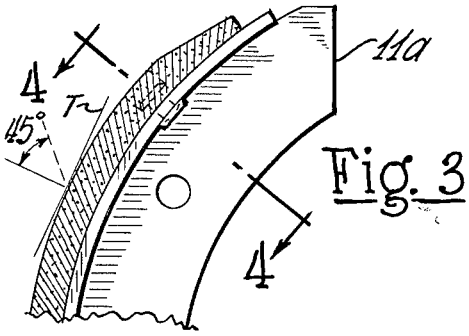
Figure 4:
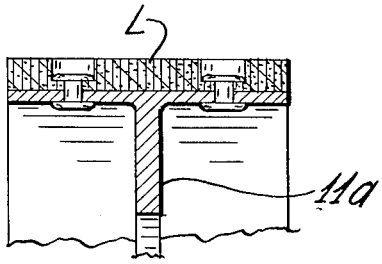
Figure 5A:
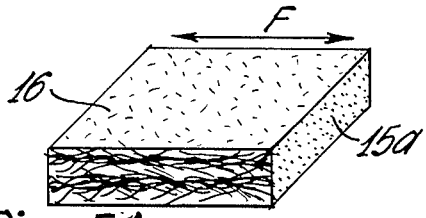
Figure 5B:
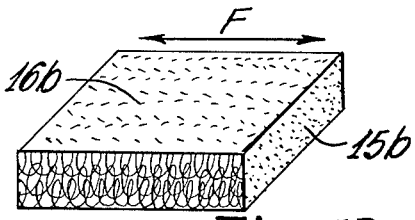
Figure 6A:
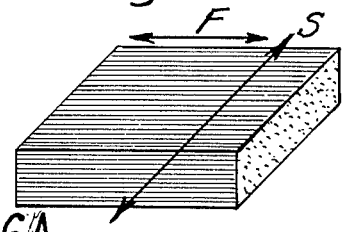
Figure 6B:
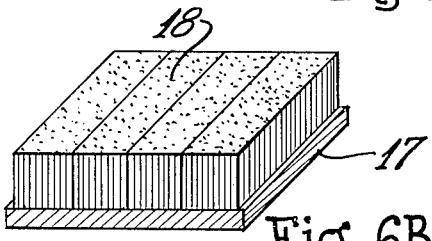
Figure 7A:
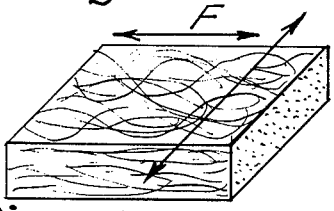
Figure 7B:
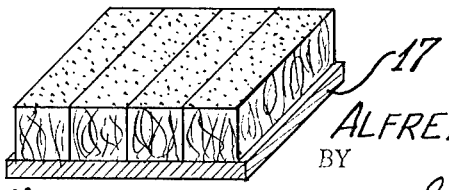
Figure 8:
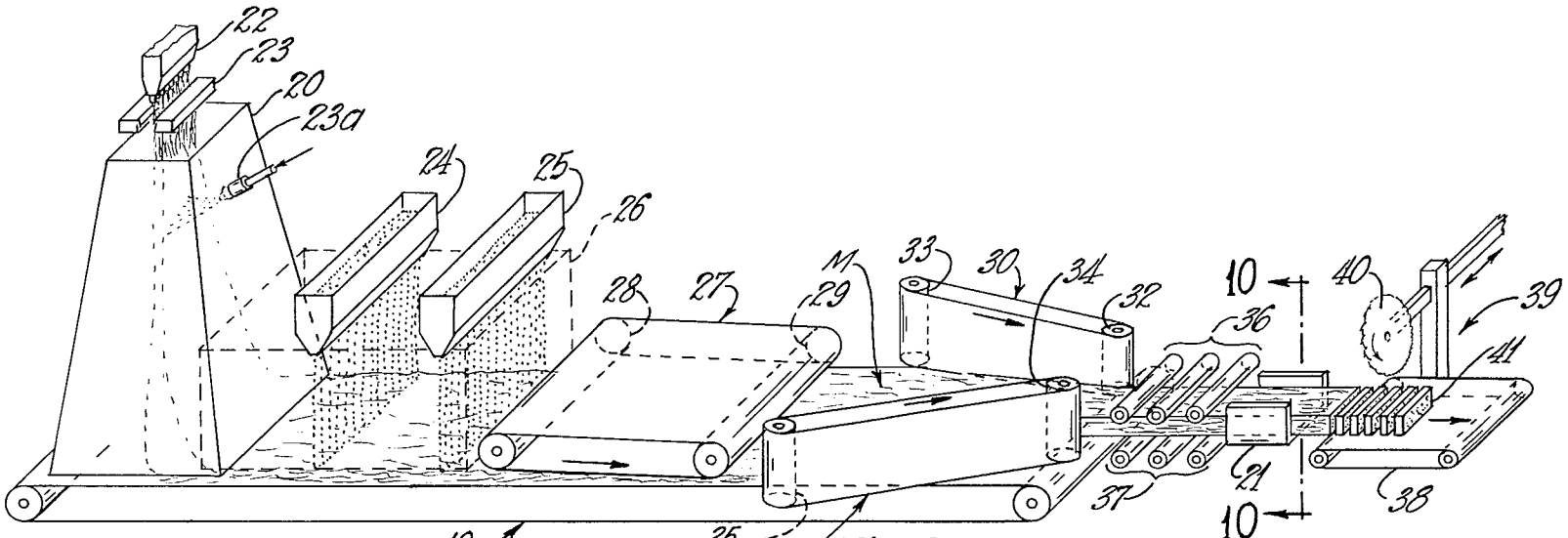
Figure 11:
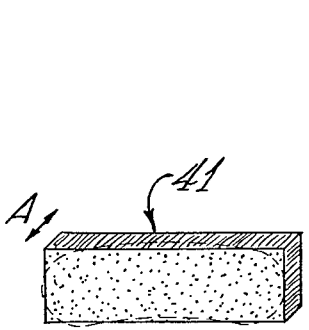
Figure 10:
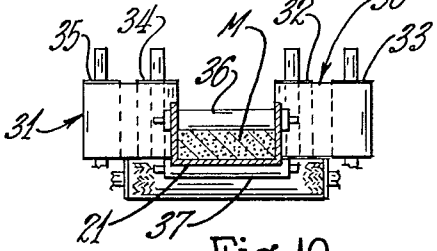
Figure 9:
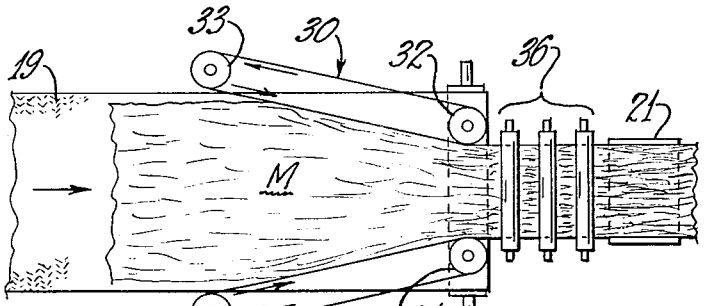

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 7

T941,012

FRICTION MATERIAL INCLUDING GLASS FIBERS AND METHOD OF MANUFACTURE

Alfred Marzocchi, 35 Thomas Leighton Blvd., Cumberland, R.I. 02864

Filed July 26, 1974, Ser. No. 483,193
Int. Cl. C03b *37/02;* F16d *69/02*
U.S. Cl. 65—3
2 Sheets Drawing. 27 Pages Specification

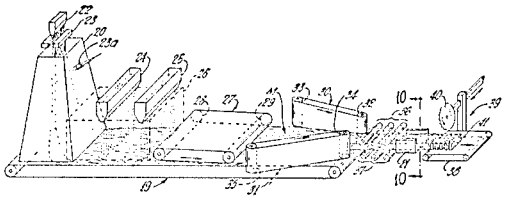

A brake lining or friction material comprised of glass fibers secured within a rigid binder and having a substantial number of ends of convolutions intersecting with the braking surface of the material. The material preferably comprises a plurality of bonded fibers generally extending in a common direction and intersecting with said braking surface. The fiber alignment may be positioned relative to the direction of relative movement of the braking members for optimum braking efficiency in one direction. Such aligned fiber materials may be produced in a continuous process in the form of uncured blocks of aligned fibers and binder which are subsequently formed under elevated pressure and temperature into brake pads or shoes or other friction components. Brake pads having aligned or oriented fibers may be produced in a continuous process, starting with the forming of glass fibers from a molten batch, depositing a ribbon of aligned fibers upon a moving conveyor, applying liquid or powdered binder to the fibers, reducing the lateral and vertical volume of the ribbon to increase the density of the fiber-binder mix and finally separating the ribbon into shapes having a surface which intersects the aligned fibers.

FRICTION MATERIAL INCLUDING GLASS FIBERS AND METHOD OF MANUFACTURE

Original Filed July 26, 1974

INVENTOR.
ALFRED MARZOCCHI
BY
Staelin & Overman
ATTORNEYS